United States Patent [19]
Hershey

[11] Patent Number: 5,841,762
[45] Date of Patent: Nov. 24, 1998

[54] MONITORING A SYNCHRONOUS DIGITAL HIERARCHY TRANSMISSION PATH

[75] Inventor: Paul Christian Hershey, Manassas, Va.

[73] Assignee: British Telecommunications public limited company, London, England

[21] Appl. No.: 624,298

[22] Filed: Mar. 29, 1996

[51] Int. Cl.[6] ....................................................... H04J 3/14
[52] U.S. Cl. ........................................... 370/252; 370/522
[58] Field of Search .................................... 370/241, 252,
370/253, 375, 376, 377, 378, 384, 386,
464, 465, 466, 467, 468, 469, 476, 503,
505, 506, 509, 513, 514, 515, 516, 522,
528, 527, 535, 537, 538, 539, 540, 541,
542, 543, 544, 545

[56] References Cited

U.S. PATENT DOCUMENTS

| | | |
|---|---|---|
| 5,315,594 | 5/1994 | Noser . |
| 5,550,876 | 8/1996 | Urbansky ................................. 370/516 |
| 5,572,515 | 11/1996 | Williamson et al. ..................... 370/252 |
| 5,600,648 | 2/1997 | Furuta et al. ............................ 370/505 |
| 5,642,357 | 6/1997 | Suzuki ..................................... 370/505 |

FOREIGN PATENT DOCUMENTS

| | | |
|---|---|---|
| 0539758 A1 | 5/1993 | European Pat. Off. . |
| 2277852 | 11/1994 | United Kingdom . |
| WO 93/25031 | 12/1993 | WIPO . |

OTHER PUBLICATIONS

Whitt et al, The Role of Sonet–Based Networks In British Telecom, IEEE International Conference on Communications ICC '90 including Supercomm Technical Sessions, SuperComm ICC '90 Conference Record (CAT. No. 90Ch2829–0), Atlanta, GA, USA, 16–19 Apr. 1990, 1990, New York, NY, USA, IEEE, USA, pp. 919–923, vol. 3.

Hershey et al, "Real time Traffic Measurements for High–Speed Networks", BT Technol J, vol. 13, No. 3, Jul. 1995, pp. 113–122.

*Primary Examiner*—Huy D. Vu
*Attorney, Agent, or Firm*—Nixon & Vanderhye P.C.

[57] ABSTRACT

A system monitors utilization of a tributary to a main SDH transmission path. The main SDH transmission path is arranged to transport a series of data frames, each of which contains virtual containers. A data signal from tributary is loaded into virtual containers reserved to carry the data signal. The monitoring system includes an optical service unit and a computer. The optical service unit monitors bytes of the virtual containers reserved to carry the tributary for the presence of a predetermined bit pattern and transmits a report containing the results of the monitoring to the computer. In the computer, data contained in the report is used to evaluate utilization of the tributary. One example of the bit pattern which is monitored is the presence of all binary "1"s in each byte of tile payload of a virtual container.

9 Claims, 5 Drawing Sheets

MONITORING A SYNCHRONOUS DIGITAL HIERARCHY TRANSMISSION PATH

BACKGROUND OF THE INVENTION

1. Field of the Invention

This invention relates to a method of monitoring transmission along a synchronous digital hierarchy transmission digital path and also to a system for monitoring such transmission.

2. Related Art

In a synchronous digital hierarchy (SDH) network, tributaries to a main SDH transmission path are connected to it by multiplexers. The tributaries and multiplexer connect terminal equipment belonging to users of the network to the main transmission path. Within the main transmission path, bandwidth is allocated between the users of the network in accordance with their requirements and these requirements vary with time. Because the bandwidth of the main transmission path is limited, at any moment in time it may happen that the bandwidth requirement of a particular user is not met in full. It has been appreciated by the inventor of the invention which is the subject of this patent application that a particular user may not be making full use of the bandwidth allocated to it. Therefore, if such underuse of an allocated bandwidth could be detected, it might be possible to persuade the user to reduce its bandwidth requirement. This could then free additional bandwidth for the user if this requirement was not met in full. It has therefore been appreciated that it is desirable to find a method of monitoring utilisation of tributaries to a main SDH transmission path.

SUMMARY OF THE INVENTION

According to one aspect of this invention, there is provided a method of operating a utilisation monitoring system for monitoring utilisation of a tributary to a main synchronous digital hierarchy (SDH) transmission path, said main transmission path being arranged to transport a series of data frames each of which contains at least one virtual container, each virtual container having a path overhead and a payload, the said tributary joining the main transmission path at a multiplexer which is arranged to load a data signal from the said tributary into virtual containers in said frames which are reserved for carrying a data signal from the said tributary, the said method comprising the steps of:

examining virtual containers reserved for carrying a data signal from the said tributary at a point on the said main transmission path for the presence of a predetermined bit pattern; and evaluating a parameter indicative of the utilisation of said tributary from the results of said examining step.

The present invention provides a method of monitoring utilisation of a tributary to a main SDH transmission path. It can be used to detect underuse of an allocated bandwidth requirement by a user who might then be persuaded to reduce its bandwidth requirement. As mentioned above, bandwidth freed in this way could then be made available for a user whose bandwidth requirement was not met. It can also be used to monitor utilisation of a tributary to detect when bandwidth usage approaches a point where additional bandwidth should be purchased.

According to another aspect of this invention, there is provided a system for monitoring utilisation of a tributary to a main synchronous digital hierarchy (SDH) transmission path, said system comprising:

means for examining virtual containers carried in SDH data frames and reserved for carrying a tributary to a main SDH transmission path at a point on the main SDH transmission path for the presence of a predetermined bit pattern; and means responsive to said examining means for evaluating a parameter indicative of the utilisation of the tributary.

BRIEF DESCRIPTION OF THE DRAWINGS

This invention will now be described in more detail, by way of example, with reference to the drawings in which.

DETAILED DESCRIPTION OF EXEMPLARY EMBODIMENTS

Figure 1:
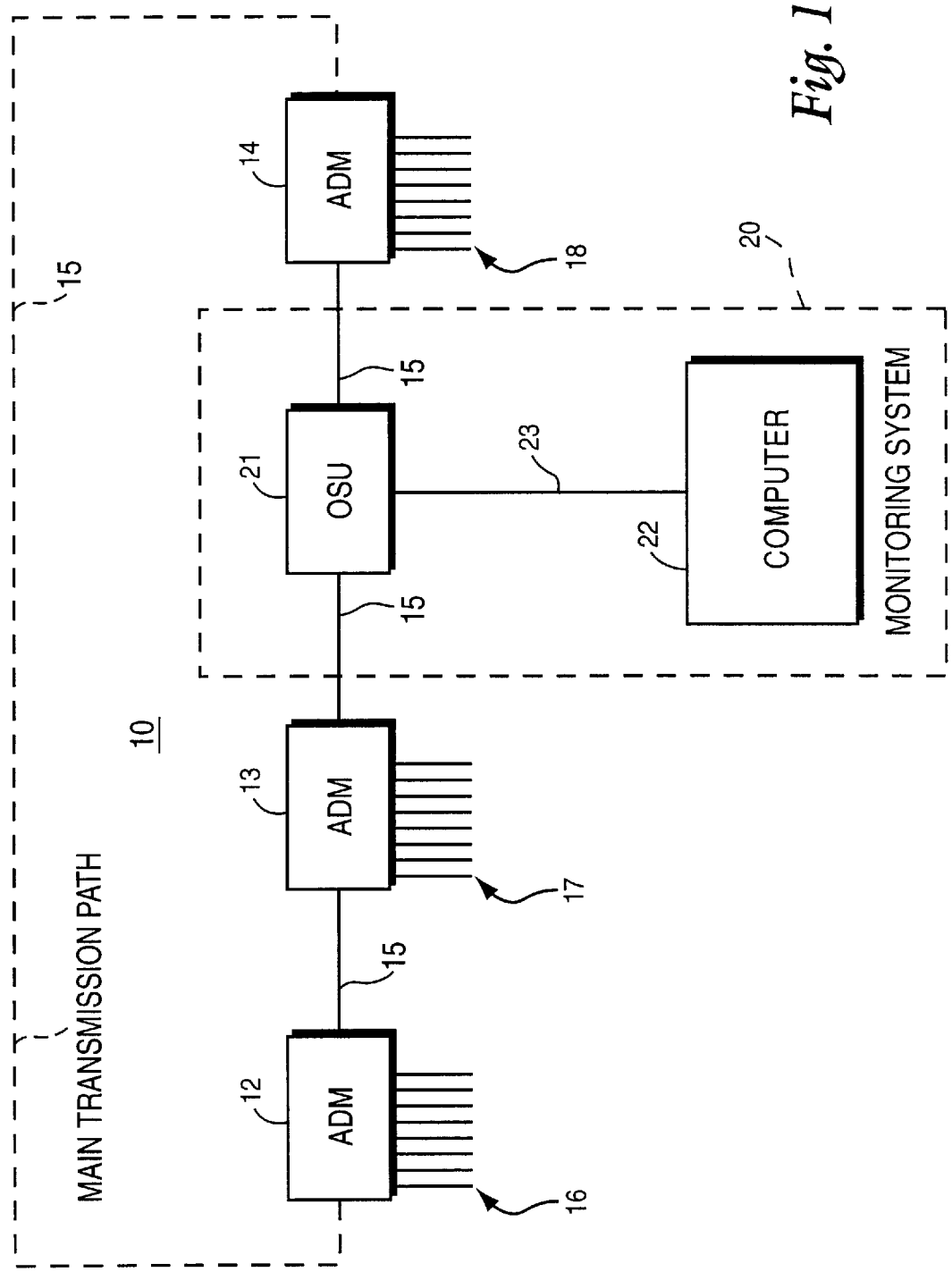
FIG. 1 is a block diagram of some components of an SDH network including a monitoring system embodying this invention.

Referring now to FIG. 1, there are shown some of the components of an SDH network. These components Include a ring 10 of add/drop multiplexers. Three of these multiplexers are shown and indicated, respectively, by reference numerals 12, 13 and 14. Between the multiplexers 12, 13 and 14, data is carried along a main transmission path 15. Between the multiplexers 12 and 13 and the multiplexers 13 and 14, the main transmission part is indicated by a solid line and this indicates that no further multiplexers are located along this part of the transmission path. Between the mutliplexers 12 and 14, the transmission path is indicated by a dashed line and this indicates that additional multiplexers, not shown, are located along this path of the transmission path. Each of the add/drop multiplexers 12, 13 and 14 has tributaries and these are denoted, respectively, by reference numerals 16, 17 and 18. The ends of the tributaries remote from the add/drop multiplexers are connected to terminal equipment belonging to the users of the SDH network. Thus, the tributaries and add/drop multiplexers connect terminal equipment to the main transmission path 15.

The SDH network also includes a monitoring system 20 which comprises an optical service unit 21 located on the main transmission path 15 between add/drop multiplexers 13 and 14 and a computer 22. The optical service unit 21 is an optical service unit type OSU 155 manufactured by GRC International Inc of 8310 Guildford Road, Suite A, Columbia, Md., USA, but modified to operate as herein described. The optical service unit 21 and the computer 22 are connected by a communication link 23. As will be described in detail below, the function of the monitoring system 20 is to monitor utilisation of tributaries to the main transmission path 15.

Between the add/drop multiplexers data is carried in STM-1 data frames. (STM stands for Synchronous Transport Module). STM-1 frames are clocked at intervals of 125 microseconds. SDH standards define higher order data frames which are clocked at higher frequencies. Higher order data frames will not be described in this example. Whilst not shown, the SDH ring 10 may be connected to another SDH ring by a crossconnect and in such a further SDH ring data may be carried in higher order STM modules.

Figure 2:
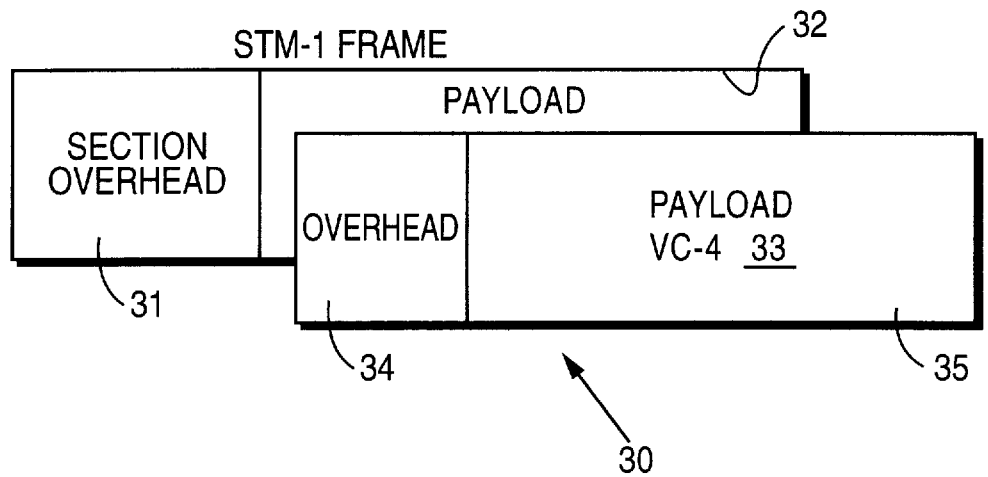
FIG. 2 is a diagram of an SDH STM-1 data frame together with a VC-4 virtual container.

An example of an STM-1 frame 30 is shown in FIG. 2. As is known to those skilled in the art, an STM-1 frame comprises a section overhead 31 and a payload 32. The section overhead 31 contains control information. The payload 32 contains data to be transported. Each STM-1 frame is 2430 bytes long, with 81 bytes in the section overhead 31 and 2349 bytes in the payload 32.

Figure 3:
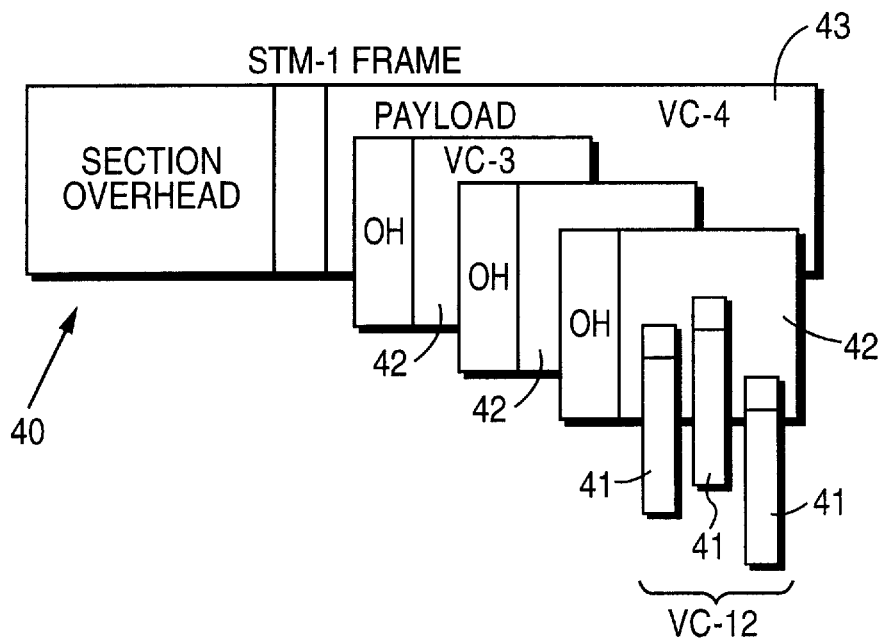
FIG. 3 is a diagram of an SDH STM-1 data frame together with virtual containers arranged in a nested manner.

Within each STM-1 frame, the payload holds one or more virtual containers which contain the data to be transported. SDH standards define a set of virtual containers of varying byte lengths. In FIG. 2, there is shown a VC-4 virtual container which is the largest container that can be carried by an STM-1 frame. Each virtual container has a path overhead which contains control information and a payload which contains the data to be transported. In the virtual container 33 shown in FIG. 2, the path overhead is indicated by reference numeral 34 and the payload is indicated by reference number 35.

Where an STM-1 frame contains smaller virtual containers, the smaller containers are loaded into larger containers in a nested manner. FIG. 3 shows an STM-1 frame 40 in which VC-12 virtual containers 41 are nested into VC-3 virtual containers 42, and the VC-3 virtual containers 42 are nested into a VC-4 virtual container 43.

At an add/drop multiplexer a tributary may be loaded into virtual containers carried by the data frames passing along the main transmission path. The data signal in the tributary is loaded into a type of virtual container which has an appropriate byte length and hence appropriate bit rate capacity to receive data carried at the bit rate of the tributary. The data signal from the tributary is loaded into a single virtual container in each data frame. Data may also be unloaded from virtual containers into a tributary. For the STM-1 frame, the VC-12 virtual container has a bit rate capacity of 2.3 Mbit/s and is thus capable of receiving a plesiochronous digital hierarchy (PDH) data signal at a bit rate of 2.048 Mbit/s. The bit rate capacity of each type of virtual container corresponds to one or more PDH bit rates as shown in Table 1 below.

TABLE 1

| Virtual Container | Capacity (Mbit/s) | Corresponding PDH Capacity (Mbit/s) |
|---|---|---|
| VC-4 | 150 | 139.264 |
| VC-3 | 50 | 34.368 & 44.736 |
| VC-2 | 6.8 | 6.312 |
| VC-12 | 2.3 | 2.048 |
| VC-11 | 1.7 | 1.544 |

In the present example, the tributaries 16, 17 and 18 carry PDH date signals at a bit rate of 2.048 Mbit/s. The add/drop multiplexers 12, 13, 14 are arranged to load the PDH data signals from the tributaries 16, 17, 18 into VC-12 containers. However, It is to be appreciated that the present invention may be used for monitoring tributaries operating at different bit rates and loaded into different types of virtual containers.

In order to provide a user of the network 10 with a bandwidth allocated to that user, one or more virtual containers are reserved in each STM-1 frame, to carry the data for the customer. For example, if the user whose terminal equipment is connected to the network by the eight tributaries 16 and add/drop multiplexer 12 requires sufficient bandwidth to carry data signals on all eight tributaries, the bandwidth requirement can be met by reserving 8 VC-12 virtual containers in each STM-1 frame. If this user requires sufficient bandwidth to carry the data signal from just one tributary, then this requirement may be met by reserving a single VC-12 virtual container in each data frame.

Each tributary to an SDH network may be unequipped or equipped. If it is unequipped, it is unused and therefore unable to carry useful data, which can be interpreted as being idle. If the tributary is equipped, it is able to carry useful data and it is either busy or idle. If it is busy it is carrying data and if it not busy then it is not carrying data.

The monitoring system 20 is arranged to monitor the utilisation of one or more tributaries. In order to monitor the utilisation of a tributary, it examines the bytes in virtual containers reserved to carry a data signal from that tributary. The monitoring system 20 evaluates utilisation of a tributary in three different ways, each of which is based on a particular condition. These conditions will now be described.

In the first condition, the optical service unit 21 examines each byte in the payload of a virtual container for the presence of all "1"s, or, in other words, for a binary value of "11111111". If each byte of the payload of the virtual container has all binary "1"s, then the condition is met. This condition will be referred to as the "ALWAYS" condition. Where each byte of the payload of the virtual container reserved to carry the data signal for a particular tributary has an all binary "1"s value, this indicates that the tributary is idle for the time segment corresponding to the virtual container regardless of whether the virtual container is equipped or unequipped. Thus, where the "ALWAYS" condition is met in the virtual container reserved for a particular tributary in a whole series of frames, then for the time period corresponding to the series of frames the tributary is completely idle. If the "ALWAYS" condition is met for only half of the frames, then the tributary is 50% utilised.

An evaluation of utilisation based on the "ALWAYS" condition will be accurate only in so far as the "ALWAYS" condition is a reliable indicator of utilisation. Because the bytes within the payload of a virtual container are liable to drift, it can happen that the "ALWAYS" condition may not be met for a particular tributary, despite the fact that the tributary is idle.

In the second condition for measuring utilisation, the bytes of the payload of a virtual container are examined for the presence of at least one byte having an all binary "1"s value, or in other words, a binary value of "11111111". This condition will be referred to as the "ONCE" condition. Thus, where the bytes in a virtual container have drifted, an evaluation of utilisation based on the "ONCE" condition may be more accurate than an evaluation based on the "ALWAYS" condition.

The path overhead of each VC-12 virtual container contains a byte which is known as the "V5" byte. If in the V5 byte, bits 5, 6 and 7 are set to a binary value of "000", this indicates that the tributary for which the virtual container is reserved is unequipped. In the third condition for measuring utilisation, the V5 byte of the path overhead of a virtual container reserved for a particular tributary is examined for the presence of a binary "000" in bits 5, 6 and 7. If this value is found, then this condition is met, This condition will be referred to as the "UNEQUIPPED" condition. The "UNEQUIPPED" condition identifies an unused, that is idle, tributary. Thus, if the "UNEQUIPPED" condition is met, in the virtual container reserved for a particular tributary in each frame of a series of frames, then the tributary is "UNEQUIPPED" for the time period corresponding to the series of frames. If the unequipped condition is not met for any of these virtual containers, then the tributary is equipped for the time period corresponding to this series of frames.

It is to be noted that the three conditions for measuring utilisation share the common feature of examining the bytes of a virtual container for the presence of a pre-determined bit pattern. The difference between the three conditions lies in the actual bit pattern which is detected.

The optical service unit 21 extracts and monitors the bytes of the frames passing along the main transmission path 15 in order to provide network management information. In addition to providing conventional network management information, the optical service unit 21 can also monitor virtual containers reserved for up to eight tributaries for the presence of the "ALWAYS" condition, the "ONCE" condition and the "UNEQUIPPED" condition. The optical service unit 15 monitors virtual containers for the presence of the three conditions for a series of polling intervals each of which has a duration of 125 milliseconds. Thus, each polling interval corresponds to 1,000 STM-1 frames. During each polling interval, the optical service unit 21 monitors the virtual containers for each tributary.

During each polling interval the optical service unit 21 examines each virtual container reserved for a particular tributary for the presence of the "ALWAYS" condition. At the end of the polling interval, the optical service unit 21 logs the number of virtual containers which satisfy the "ALWAYS" condition.

Similarly, during each polling interval, the optical service unit 21 monitors each virtual container reserved for a particular tributary for the presence of the "ONCE" condition. At the end of the polling interval, it logs the total number of virtual containers in that interval which satisfy the "ONCE" condition.

During each polling interval, the virtual containers reserved for a particular tributary are monitored for the presence of the "UNEQUIPPED" condition. At the end of the polling interval, it logs the number of virtual containers which have been examined for the "UNEQUIPPED" condition which satisfy this condition.

At the end of each measurement period, which in the present example, is 5 seconds, the optical service unit 21 produces a report. For each monitored tributary, the report specifies the number of polling intervals (usually 40), the number of virtual containers which satisfy the "ALWAYS" condition, the number of virtual containers which have satisfied the "ONCE" condition and the number of virtual containers which have been found to satisfy the "UNEQUIPPED" condition. A report is generated and transmitted to computer 22 on communications link 23.

Figure 4:
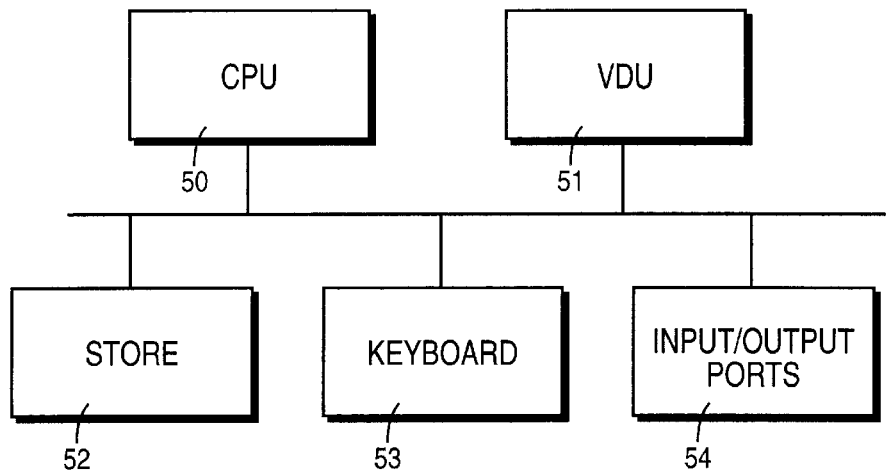
FIG. 4 is a block diagram of the components of the computer shown in FIG. 1.

The computer 22 uses the reports from the optical service unit 21 to evaluate utilisation of the monitored tributaries. The computer 22 is of conventional construction and its main components are shown in FIG. 4. As shown in FIG. 4, the components of computer 22 comprise a central processing unit 50, a visual display unit (VDU) 51, a store 52, keyboard 53 and input and output ports 54. The store 52 is formed from hard-disk store, random-access-memory and read-only-memory. The store 52 contains the programs which control the operation of computer 22 and also the program which is used for evaluating tributary utilisation.

Figure 5:
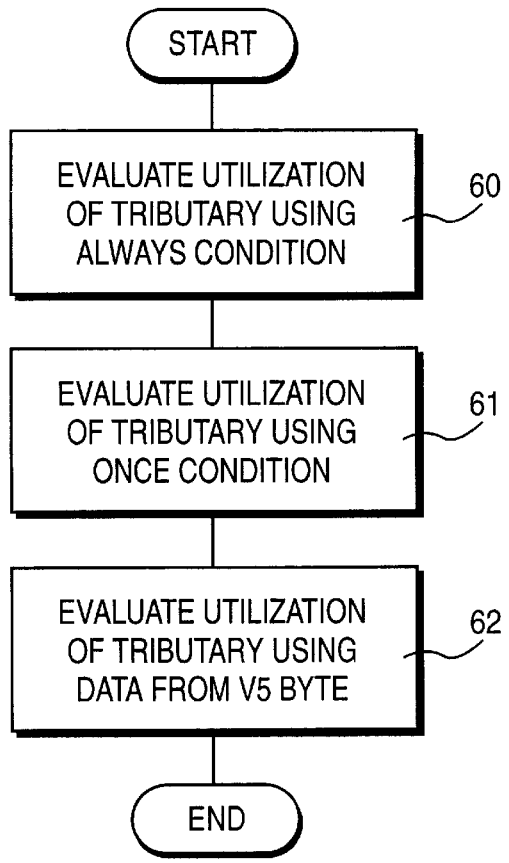
FIGS. 5 & 6 are flow charts illustrating the operation of the monitoring system shown in FIG. 1.
Figure 6:
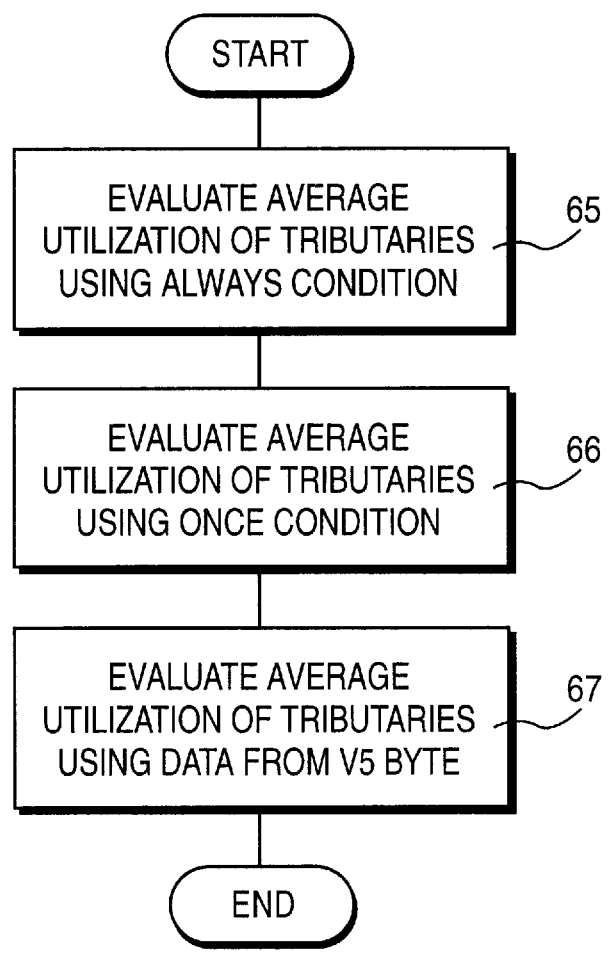
Figure 7:
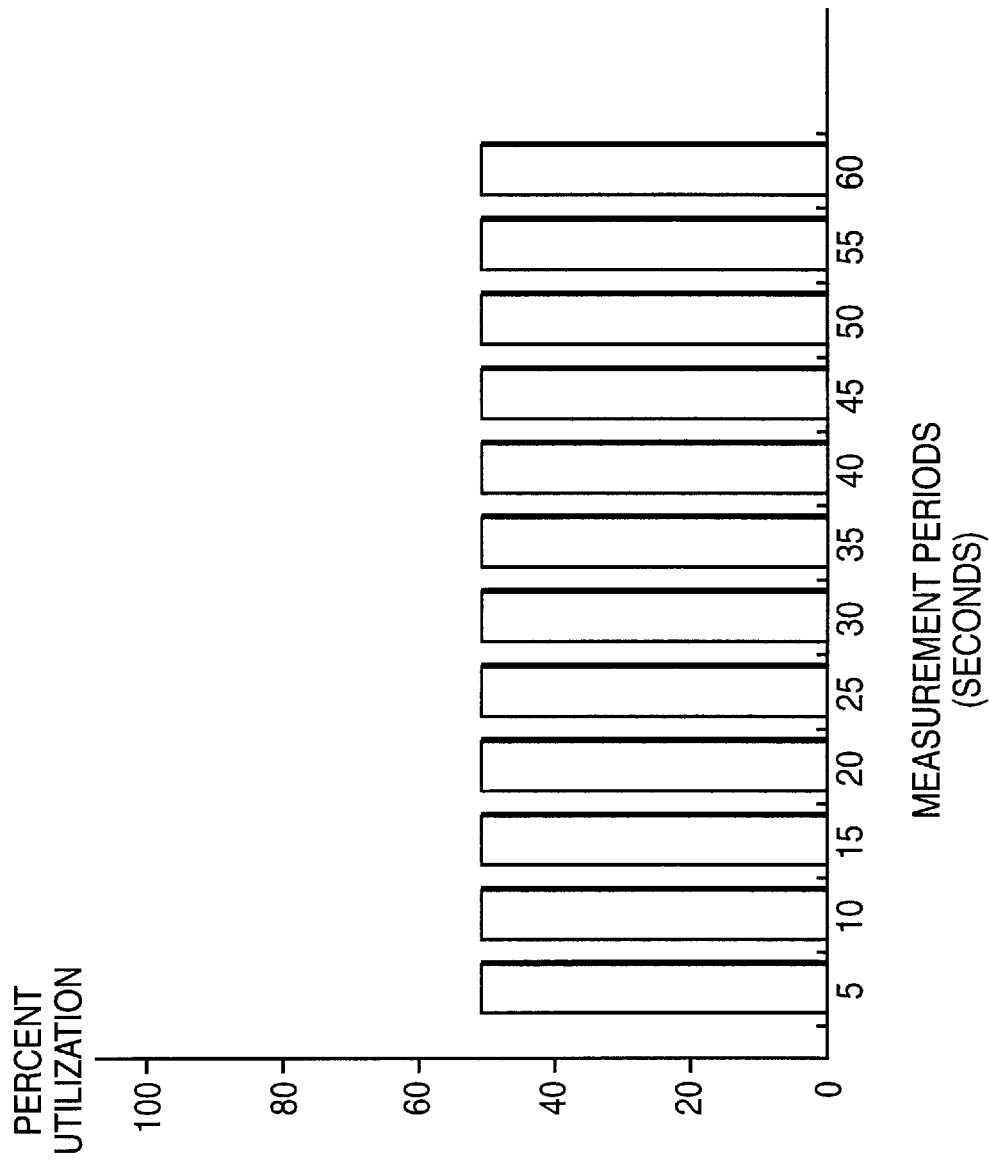
FIG. 7 is a diagram illustrating a display produced by the monitoring system.

For each measurement period, for each tributary the computer 22 evaluates three parameters $U_A$, $U_O$ and $U_E$ indicative of utilisation of the tributary. The three parameters $U_A$, $U_O$ and $U_E$ are based, respectively, on the "ALWAYS" condition, the "ONCE" condition and "UNEQUIPPED" condition. For each measurement period, the computer 22 also calculates three parameters $U_{AA}$, $U_{AO}$ and $U_{AE}$ for the average utilisation of the monitored tributaries. The flow chart for the part of the program which is used to calculate the three parameters $U_A$, $U_O$ and $U_E$ for each individual tributary is shown in FIG. 5 and the part of the program which is used to evaluate the three parameters for the average of the three tributaries is shown in FIG. 6. These two flow charts will now be described.

Referring now to FIG. 5, in a step 60, the computer 22 evaluates a parameter $U_A$ which represents utilisation of the monitored tributary based on the "ALWAYS" condition using the following equations:

$$U_A = (1 - I_A), \qquad (1)$$

where
$I_A = P_A/Q_A$
$P_A$ = number of virtual containers reserved for the tributary examined in the measurement period which satisfy the "ALWAYS" condition
$Q_A$ = total number of virtual containers reserved for the tributary examined in measurement period The value of $Q_A$, which represents the total number of virtual containers reserved for the tributary examined in the measurement period, is obtained by multiplying the number of polling intervals in the measurement period by 1,000. There are 1,000 frames in each polling interval.

In a step 61, the computer evaluates a parameter $U_O$ which represents the utilisation of the monitored tributary based on the "ONCE" condition using an equation which is similar to Equation 1 set out above but modified for the "ONCE" condition.

In a step 62, the computer 22 evaluates a parameter $U_E$ which represents the utilisation of the monitored tributary based on the "UNEQUIPPED" condition using an equation which is similar to Equation 1 above but which is modified for a the "UNEQUIPPED" condition.

Referring now to FIG. 6, in a step 65, a parameter $U_{AA}$ which represents the average utilisation of the monitored tributaries based on the "ALWAYS" condition is evaluated in accordance with Equation 2 set out below:

$$U_{AA} = \left(1 - \frac{\sum_{n=1}^{N} I_{An}}{N}\right), \text{ where} \qquad (2)$$

$I_{An} = P_{An}/Q_{An}$
$P_{An}$ = number of virtual containers reserved for monitored tributary n examined in the measurement period which satisfy the ALWAYS condition
$Q_{An}$ = total number of virtual containers reserved for monitored tributary n examined in measurement period
N = number of monitored tributaries In the present example, the number of monitored tributaries N may have a value of up to 8.

In a step 66, a parameter $U_{AO}$ representing the average utilisation of the monitored tributaries based on the "ONCE" condition is evaluated in accordance with an equation similar to Equation 2 set out above but modified for the "ONCE" condition.

Lastly, in step 67, a parameter $U_{AE}$ representing the average utilisation of the monitored attributories based on the "UNEQUIPPED" condition is evaluated in accordance with an equation similar to Equation 2 set out above but modified for the "UNEQUIPPED" condition.

Each of the parameters representing tributary utilisation may be displayed on VDU 51 for successive time periods by using a bar chart. An example of a bar chart is shown in FIG.

7. As may be seen, for each measurement period the parameter is displayed as percent utilisation.

The steps 60 to 62 and 65 to 67 are performed effectively simultaneously at the end of each measurement period and the six parameters may then be displayed at the same time.

Thus, by using the monitoring system 20, an operator may monitor both the individual and average utilisation of the monitored tributaries. By evaluating the utilisation in accordance with the three different conditions, the reliability of the evaluation is improved. If the operator finds that either a single tributary or a group of monitored tributaries is underused, he may suggest to the user of that tributary or tributaries that it would be appropriate to reduce the user's bandwidth requirement. If the user does reduce its bandwidth requirement, then the spare bandwidth may be allocated to another user who may require additional bandwidth. Also, if the operator finds that the bandwidth usage of a single tributary or a group of monitored tributaries is approaching a point where additional bandwidth should be purchased, he may suggest to the user of that tributary or tributaries that it would be appropriate to purchase additional bandwidth.

Although the present invention has been described with respect to monitoring tributaries to an SDH ring in which the tributaries operate at a PDH bit rate of 2.048 Mbits, it is to be appreciated that the present invention may be applied to monitoring utilisation of tributaries which operate at other bit rates. Also, the present invention may be used for monitoring utilisation of tributaries to an SDH transmission path which is arranged along a line, rather than in a ring.

In this specification, the expression "synchronous digital hierarchy network" is intended to include a network operating to synchronous optical network (SONET) standards. These standards are considered a subset of SDH standards.

I claim:

1. A method of operating a utilisation monitoring system for monitoring utilisation of a tributary to a main synchronous digital hierarchy (SDH) transmission path, said main transmission path being arranged to transport a series of data frames each of which contains at least one virtual container, each virtual container having a path overhead and a payload, said tributary joining the main transmission path at a multiplexer which is arranged to load a data signal from said tributary into virtual containers in said frames which are reserved for carrying a data signal from said tributary, said method comprising the steps of:

examining virtual containers reserved for carrying a data signal from said tributary at a point on said main transmission path for the presence of a predetermined bit pattern; and evaluating a parameter U indicative of the utilisation of said tributary from the results of said examining step, wherein in said evaluating step, said parameter U is evaluated for each one of a series of measurement periods in accordance with the following equation:

$$U=(1-I),$$

where

I=P/Q

P=number of virtual containers examined in the measurement period having said bit pattern Q=total number of virtual containers examined in the measurement period.

2. A method of operating a utilisation monitoring system as in claim 1 in which said predetermined bit pattern is the presence of all binary "1"s in each byte of the payload of a virtual container.

3. A method of operating a utilisation monitoring system as in claim 1 in which said predetermined bit pattern is the presence of all binary "1"s in at least one byte in the payload of a virtual container.

4. A method of operating a utilisation monitoring system as in claim 1 in which said predetermined bit pattern is the presence of a bit pattern in the path overhead of a virtual container which indicates that the tributary is unequipped.

5. A system for monitoring utilisation of a tributary to a main synchronous digital hierarchy (SDH) transmission path, said system comprising:

means for examining virtual containers carried in SDH data frames and reserved for carrying a tributary to a main SDH transmission path at a point on the main SDH transmission path for the presence of a predetermined bit pattern; and means responsive to said examining means for evaluating a parameter U indicative of the utilisation of the tributary, said evaluating means being arranged to evaluate the said parameter U for each one a series of measurement periods in accordance with the following equation:

$$U=(1-I),$$

where

I=P/Q

P=number of virtual containers examined in the measurement period having said bit pattern Q =total number of virtual containers examined in the measurement period.

6. A system for monitoring the utilisation of a tributary to a main SDH transmission path as in claim 5 in which said predetermined bit pattern is the presence of all binary "1"s in each byte of the payload of a virtual container.

7. A system for monitoring utilisation of a tributary to a main SDH transmission path, as in claim 5 in which set predetermined bit pattern is the presence of all binary "1"s in at least one byte of the payload of a virtual container.

8. A system for monitoring utilisation of tributary to a main SDH transmission path as in claim 5 in which said predetermined bit pattern is presence of a bit pattern in the path overhead of a virtual container which indicates that the tributary is unequipped.

9. A system for monitoring utilisation of tributary to a main SDH transmission path as in claim 5 further including means for displaying said parameter.

* * * * *